US011495956B1

(12) United States Patent
Marzano et al.

(10) Patent No.: US 11,495,956 B1
(45) Date of Patent: Nov. 8, 2022

(54) WIDERANGE SHUNT AND UNDERVOLTAGE

(71) Applicant: Rockwell Automation Switzerland GmbH, Aarau (CH)

(72) Inventors: Thomas Strebel Marzano, Birmenstorf (CH); Walter Hunziker, Aarau (CH)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/410,681

(22) Filed: Aug. 24, 2021

(51) Int. Cl.
*H02H 1/06* (2006.01)
*H02H 3/20* (2006.01)
(Continued)

(52) U.S. Cl.
CPC ............ *H02H 1/06* (2013.01); *H01H 71/123* (2013.01); *H01H 83/20* (2013.01); *H02H 3/20* (2013.01)

(58) Field of Classification Search
CPC ...... H01C 10/36; H01C 10/366; H01C 10/38; H01H 2003/266; H01H 2003/268; H01H 2083/203; H01H 3/24; H01H 3/3021; H01H 3/3052; H01H 71/04; H01H 71/10; H01H 71/123; H01H 71/74; H01H 83/20; H01H 9/167; H02H 1/06; H02H 3/20
See application file for complete search history.

(56) References Cited

U.S. PATENT DOCUMENTS 4,706,158 A 11/1987 Todaro et al.
6,167,329 A 12/2000 Engel et al.
(Continued)

FOREIGN PATENT DOCUMENTS

CA 1274872 A 10/1990
CN 102255275 A 11/2011
(Continued)

OTHER PUBLICATIONS

"Electronic Trip Insulated Case Circuit Breakers", Square D, Downloaded from www.se.com on Aug. 27, 2021, Aug. 1997, 32 pages.
(Continued)

*Primary Examiner* — Jared Fureman
*Assistant Examiner* — Nicolas Bellido
(74) *Attorney, Agent, or Firm* — Fay Sharpe LLP

(57) ABSTRACT

A trip apparatus has a power terminal, an actuator, a rectifier coupled to the power terminal, a selector, and a processor, the actuator having a pusher member and a coil, the pusher member movable between a first position that does not actuate an actuator interface of a connected circuit breaker and a second position that actuates the actuator interface. The processor has a first input, a second input, and an output, the first input of the processor is coupled to the output of the rectifier, the second input of the processor coupled to an output of the selector, and the output of the processor coupled to the actuator. The processor determines a threshold based on a select signal received at the second input of the processor, and compares a voltage at the first input of the processor to the threshold. The processor controls the coil to selectively control the pusher member in the first or second position based on the comparison of the voltage at the first input of the processor to the threshold.

20 Claims, 5 Drawing Sheets

(51) Int. Cl.
  *H01H 83/20* (2006.01)
  *H01H 71/12* (2006.01)

(56) References Cited

U.S. PATENT DOCUMENTS

| | | | | |
|---|---|---|---|---|
| 6,288,348 B1* | 9/2001 | Eberts | .................... | H01H 71/66 |
| | | | | 200/330 |
| 2002/0149451 A1* | 10/2002 | Bogdon | ................... | H01H 3/36 |
| | | | | 335/68 |
| 2006/0250200 A1* | 11/2006 | Babu | .................... | H01H 71/505 |
| | | | | 335/6 |
| 2010/0059482 A1* | 3/2010 | Christensen | ............. | H01H 3/26 |
| | | | | 307/143 |
| 2010/0134220 A1* | 6/2010 | Mittelstadt | ......... | H01H 11/0006 |
| | | | | 337/333 |
| 2010/0164657 A1* | 7/2010 | Mittelstadt | ............. | H01H 71/24 |
| | | | | 335/9 |
| 2011/0286134 A1 | 11/2011 | Zylstra et al. | | |
| 2012/0182664 A1* | 7/2012 | Wan | ......................... | H01H 3/26 |
| | | | | 361/115 |
| 2015/0091485 A1* | 4/2015 | Lemberg | ................... | H02H 3/24 |
| | | | | 318/453 |
| 2015/0171614 A1 | 6/2015 | Hymel et al. | | |
| 2018/0247775 A1* | 8/2018 | Rossi | .................... | H01H 33/42 |
| 2019/0131099 A1* | 5/2019 | Fleitmann | ............. | H01H 71/74 |

FOREIGN PATENT DOCUMENTS

| | | |
|---|---|---|
| CN | 204089158 U | 1/2015 |
| DE | 10 2009 025 519 A1 | 1/2011 |
| FR | 2760147 A1 | 8/1998 |

OTHER PUBLICATIONS

"Molded-Caes Circuit Breakers & Enclosures 27.0-1", Eaton Corporation, Apr. 2016, Sheet 27136, downloaded from www.eaton.com on Aug. 24, 2021, 136 pages.

"Installation Instructions for Shunt Trip for LDB, LD, HLD, LDC, LW, HLW, LWC Circuit Breakers, Series C Molded Case Switches, and Motor Circuit Protectors (HMCP)", Eaton Corporation, Effective Aug. 2011, Instruction Leaflet IL29C146C, downloaded from www.eaton.com on Aug. 24, 2021, 8 pages.

* cited by examiner

WIDERANGE SHUNT AND UNDERVOLTAGE

BACKGROUND INFORMATION

The subject matter disclosed herein relates to power converters and extending the lifetime thereof.

BRIEF DESCRIPTION

In one aspect, a motor drive system includes a circuit breaker, a motor drive, and a trip apparatus. The circuit breaker has a line contact adapted to be coupled to a power line, a load contact coupled to the motor drive, and an actuator interface. The circuit breaker operates in a first state to electrically couple the line contact to the load contact, and a second state to electrically disconnect the line contact from the load contact. The circuit breaker operates in the second state responsive to mechanical actuation of the actuator interface. The trip apparatus has a power terminal, an actuator, a selector, a processor, and a rectifier coupled to the power terminal. The actuator has a pusher member movable between a first position that does not actuate the actuator interface and a second position that actuates the actuator interface. The processor has a first input coupled to the output of the rectifier, a second input coupled to an output of the selector, and an output coupled to the actuator. The processor determines a threshold based on a select signal received at the second input of the processor, compares a voltage at the first input of the processor to the threshold, and controls a voltage of the coil to selectively control the pusher member in the first or second position based on the comparison of the voltage at the first input of the processor to the threshold.

In another aspect, a trip apparatus includes a power terminal, an actuator, a rectifier, a selector, and a processor. The actuator has a pusher member movable between a first position that does not actuate the actuator interface and a second position that actuates the actuator interface. The processor has a first input coupled to the output of the rectifier, a second input coupled to an output of the selector, and an output coupled to the actuator. The processor determines a threshold based on a select signal received at the second input of the processor, compares a voltage at the first input of the processor to the threshold, and controls a voltage of the coil to selectively control the pusher member in the first or second position based on the comparison of the voltage at the first input of the processor to the threshold.

In a further aspect, a circuit breaker system includes a circuit breaker and a trip apparatus. The circuit breaker has a line contact adapted to be coupled to a power line, a load contact coupled to the motor drive, and an actuator interface. The circuit breaker operates in a first state to electrically couple the line contact to the load contact, and a second state to electrically disconnect the line contact from the load contact. The circuit breaker operates in the second state responsive to mechanical actuation of the actuator interface. The trip apparatus has a power terminal, an actuator, a selector, a processor, and a rectifier coupled to the power terminal. The actuator has a pusher member movable between a first position that does not actuate the actuator interface and a second position that actuates the actuator interface. The processor has a first input coupled to the output of the rectifier, a second input coupled to an output of the selector, and an output coupled to the actuator. The processor determines a threshold based on a select signal received at the second input of the processor, compares a voltage at the first input of the processor to the threshold, and controls a voltage of the coil to selectively control the pusher member in the first or second position based on the comparison of the voltage at the first input of the processor to the threshold.

DETAILED DESCRIPTION

Figure 1:
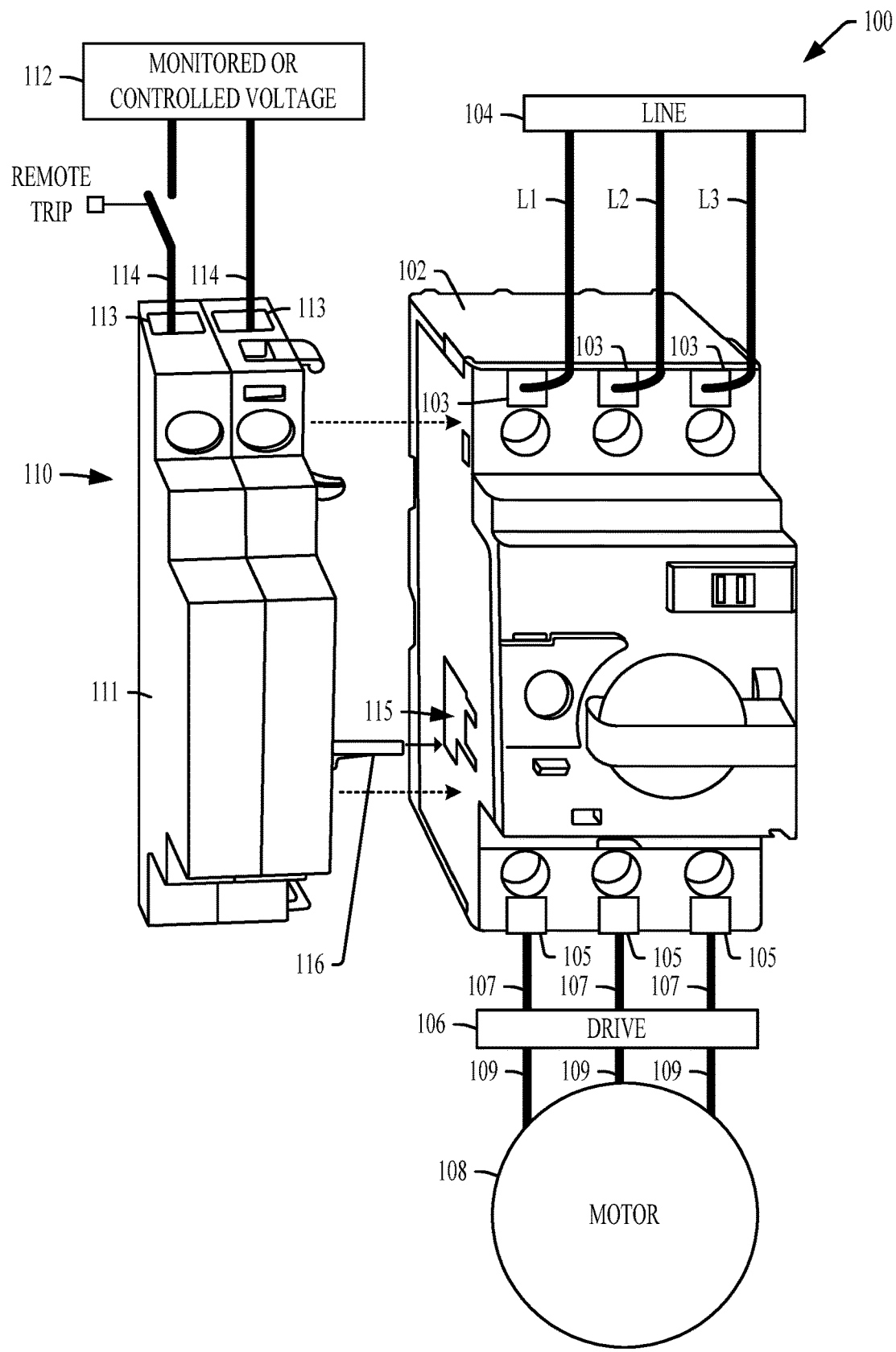
FIG. 1 is a front perspective view of a motor drive system with a universal shunt trip or undervoltage trip apparatus.

Referring now to the figures, several embodiments or implementations are hereinafter described in conjunction with the drawings, wherein like reference numerals are used to refer to like elements throughout, and wherein the various features are not necessarily drawn to scale.

Figure 1A:
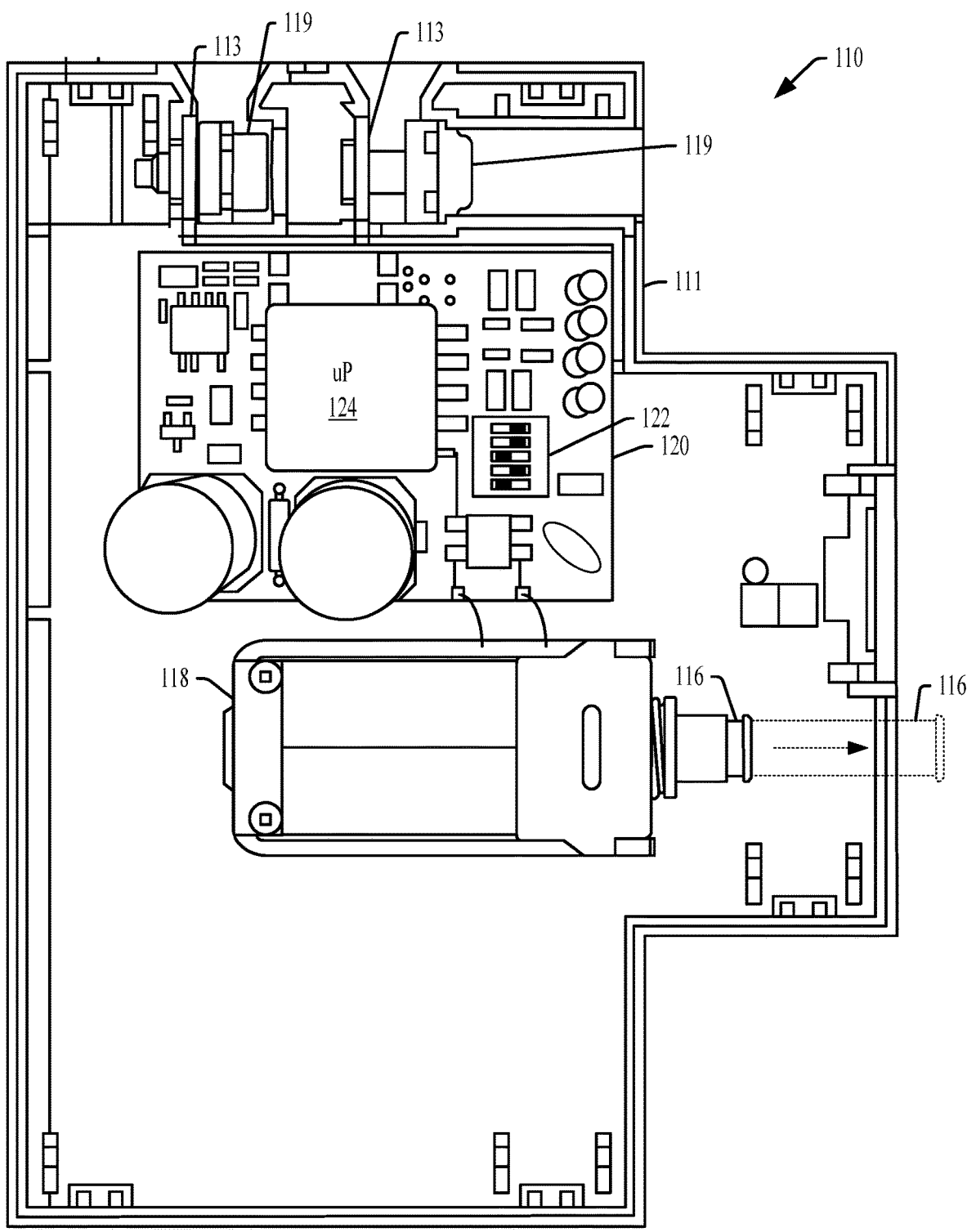
FIG. 1A is a side view of the trip apparatus with a processor, a circuit board and a mechanical actuator.
Figure 1B:
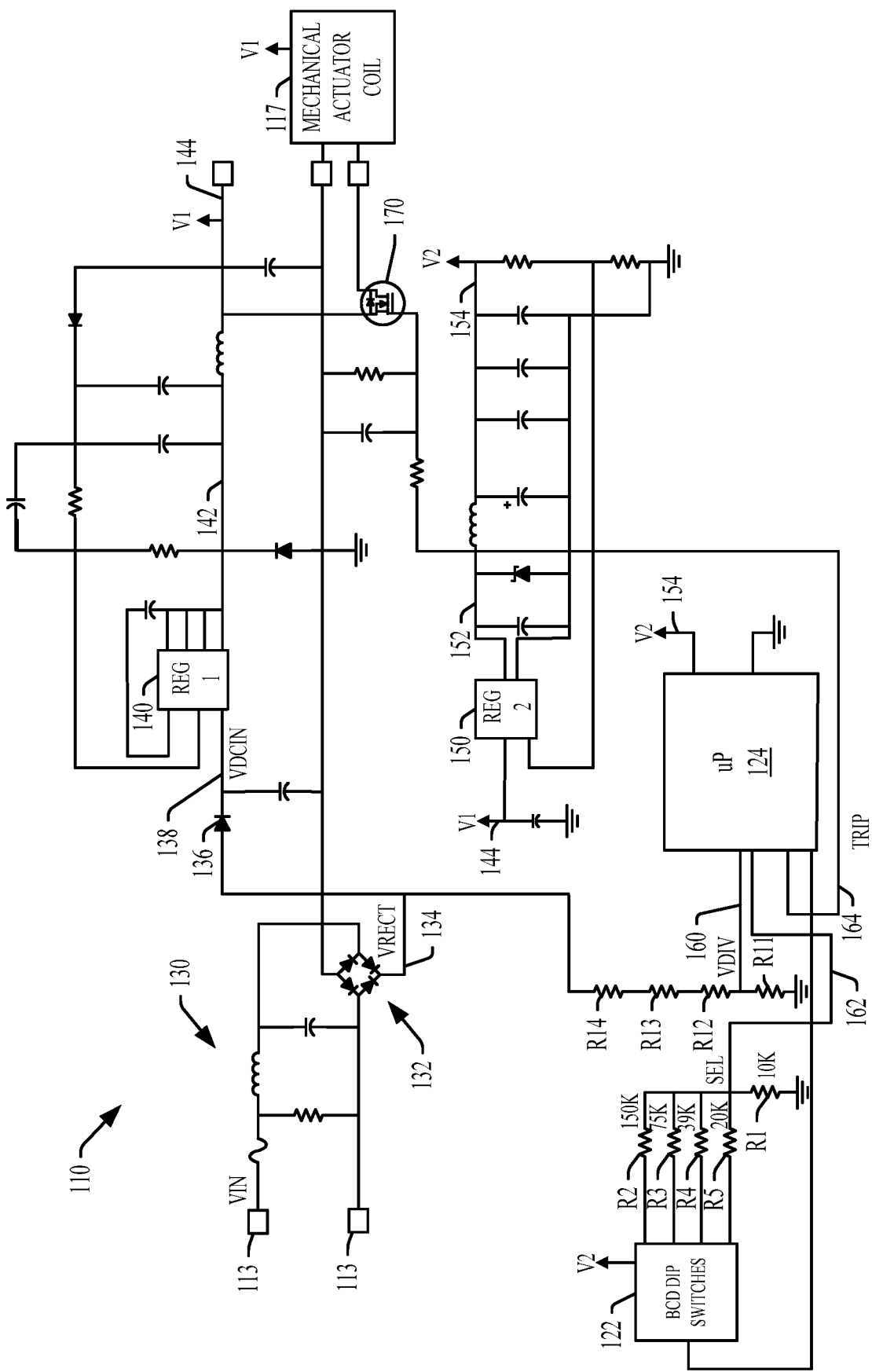
FIG. 1B is a schematic diagram of the circuit board.

FIG. 1 shows a motor drive system 100 with a universal shunt trip or undervoltage trip apparatus. FIG. 1A shows a side view of the trip apparatus with a processor, a circuit board with a selector, and a mechanical actuator, and FIG. 1B is a schematic diagram of the circuit board in FIG. 1A. In practice, circuit breaker systems are provided in line with a motor drive to facilitate power disconnection for different situations including user-initiated trips for system maintenance, automated trips for detected overcurrent or undervoltage conditions, over temperature conditions, etc. A shunt trip releases a circuit breaker mechanically when power to the shunt trip terminals is applied by a controlled voltage, such as a user actuatable switch connected between the shunt trip and a power supply. An undervoltage trip releases a circuit breaker mechanically in response to voltage at the undervoltage trip terminals falling below a threshold level. Both types of trip apparatus operate using a monitored or controlled voltage, but the voltage levels and ranges can vary widely for different host systems. Accordingly, shunt trip and undervoltage trip devices are designed for narrow voltage ranges, and manufacturers need to build and maintain inventory for a variety of different devices.

The motor drive system 100 includes a universal trip apparatus 110 that can accommodate use as a shunt trip in combination with a controlled voltage 112 or as an undervoltage trip device in combination with a monitored voltage 112. The trip apparatus 110 is configurable by a user via an included selector 122 (e.g., FIGS. 1A and 1B) to accommodate a specific voltage range and trip mode (e.g., SHUNT TRIP or UNDERVOLTAGE TRIP) for a given host system application. The trip apparatus 110 is an electromechanical actuator that mechanically actuates an actuator interface of a circuit breaker 102 to interrupt power delivery from a power line system 104 to a motor drive 106 and a controlled motor 108. In one example, the illustrated motor drive 106 includes a contactor (not shown).

The system 100 in FIG. 1 includes a circuit breaker system having the circuit breaker 102 and the trip apparatus 110. In the illustrated example, the trip apparatus 110 has a housing or enclosure 111 that includes attachment features allowing the trip apparatus 110 to be mechanically mounted onto a side of the circuit breaker 102. The circuit breaker 102 has three line contacts 103 coupled by power lines L1, L2, and L3 to a power line system 104. The illustrated system is a three-phase power distribution and circuit breaker system. In other implementations, a single phase or other multiphase circuit breaker system can be used having one or more line contacts 103. The line contacts 103 in one implementation individually include conductive clamp features that mechanically and electrically engage conductive wires of the respective power lines L1-L3 by spring or screw clamping features, for example, as shown in FIG. 1A. The illustrated three-phase circuit breaker 102 also includes three load contacts 105 shown as connecting the circuit breaker 102 to three corresponding inputs of a three-phase motor drive 106 using load side phase wires 107. The motor load 108 in this example is a three-phase motor having three phase lines 109 coupled to respective inverter outputs of the motor drive 106.

The trip apparatus 110 includes one or more power terminals 113. In a shunt trip implementation, the controlled voltage 112 is coupled to the power terminals 113 by wires 114, and one of the terminals of the controlled voltage 112 is connected through a remote trip switch to the respective power terminal 113. This implementation allows a user to actuate the remote trip switch to cause the trip apparatus 110 to mechanically actuate the circuit breaker 102. In an undervoltage trip implementation, two terminals of the monitored voltage 112 are coupled to the respective power terminals 113, and the switch can be omitted. The monitored voltage 112 in one implementation can be a system voltage, for example, a supply voltage of the motor drive 106, and the trip apparatus 110 monitors the voltage to detect power loss or other undervoltage conditions in the system 100 and selectively actuate the circuit breaker 102 in response to a detected undervoltage condition.

The circuit breaker 102 includes an actuator interface 115, the line contact 103 adapted to be coupled to a power line L1, L2, L3, the circuit breaker 102 operates in a first state or a second state. In the first state, the circuit breaker 102 electrically couples the line contacts 103 to the respective load contacts 105. In the second state, the circuit breaker 102 electrically disconnects the line contacts 103 from the respective load contacts 105. In the illustrated example, the circuit breaker 102 operates in the second state responsive to mechanical actuation of the actuator interface 115. In one example, the actuator interface 115 of the circuit breaker 102 includes an opening in a sidewall of the circuit breaker housing that allows entry of a pusher member 116 of the trip apparatus 110 into the interior of the circuit breaker 102. The pusher member 116 in one example is a linearly actuated structure that is movable between a first position that does not actuate the actuator interface 115 and a second position that actuates the actuator interface 115.

As further shown in FIGS. 1A and 1B, the trip apparatus 110 includes an actuator 118, a printed circuit board or PCB 120, a selector 122, a processor 124, and a rectifier 132 (FIG. 1B). The power terminal 113 in FIG. 1A is coupled to the monitored or controlled voltage 112 by the corresponding wires 114 entering passageways of the trip apparatus housing 111 and engaging the conductive power terminals 113. The trip apparatus 110 in this example includes screws 119 that are accessible by a screwdriver or other tool through corresponding passageways in the enclosure housing 111 to allow a user to clamp the inserted wires 114 and electrical and mechanical contact with the respective power terminals 113.

As shown in FIG. 1A, the pusher member 116 is movable between a first position shown in solid lines, and a second position shown in dashed lines in response to a signal from the circuit board 120 that is provided to a mechanical actuator coil 117 (FIG. 1B) of the actuator 118. The pusher member 116 moves along a direction indicated by arrows in FIGS. 1 and 1A. When the trip apparatus 110 is connected to the circuit breaker 102, positioning of the pusher member 116 in the second position mechanically actuates the actuator interface 115 of the circuit breaker 102, causing the circuit breaker 102 to operate in the second state to electrically disconnect the line contacts 103 from the respective load contacts 105, thereby removing input power from the motor drive 106 in FIG. 1. In the example of FIGS. 1, 1A and 1B, the selector 122 includes an electrical switch component 122 (e.g., a duel in-line (DIP) switch) soldered to the PCB 120, and having multiple (e.g., 5) two-position switches. In one example, the selector 122 provides a binary encoding of the positions of the individual switches to generate a select signal used by the processor 124 to configure the trip apparatus.

The configuration of the selector 122 by a user sets a threshold used by the processor. In this or other examples, the configuration also sets a trip mode (e.g., SHUNT TRIP or UNDERVOLTAGE TRIP) the user desires to be implemented by the trip apparatus 110. In operation, the trip apparatus 110 compares a signal that represents the voltage at the power terminals 113 to the configured threshold and selectively mechanically actuates the actuator interface 115 of the circuit breaker 102 by controlling a voltage of the actuator coil 117 in response to the result of the threshold comparison.

Figure 1C:
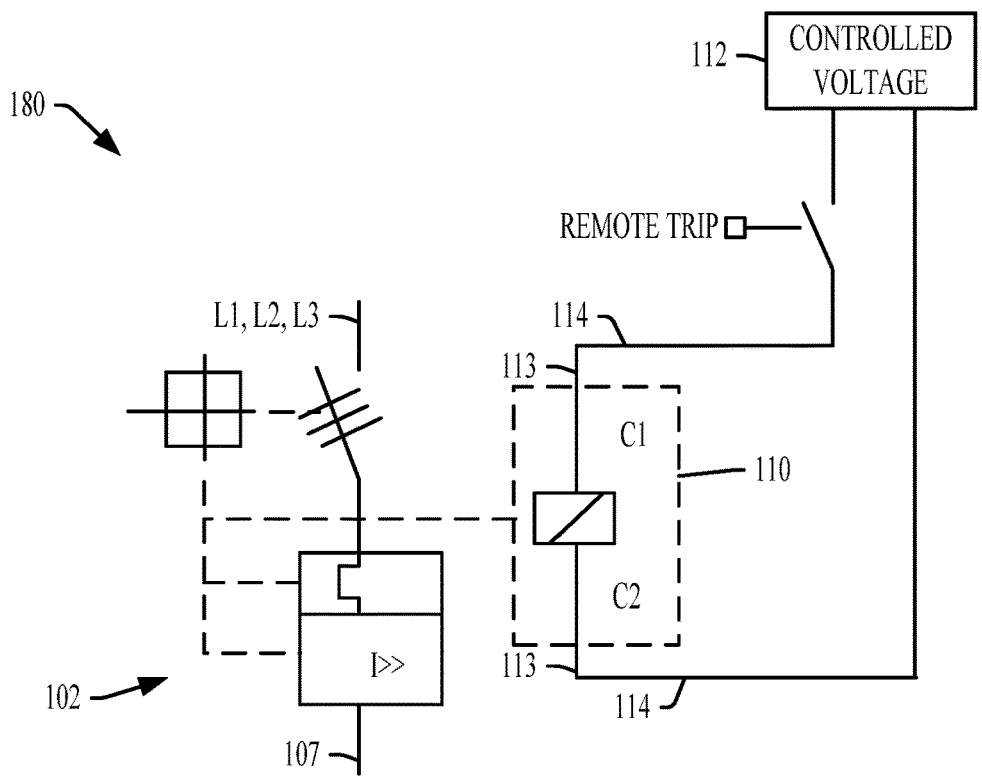
FIG. 1C is a schematic diagram of a shunt trip implementation.
Figure 1D:
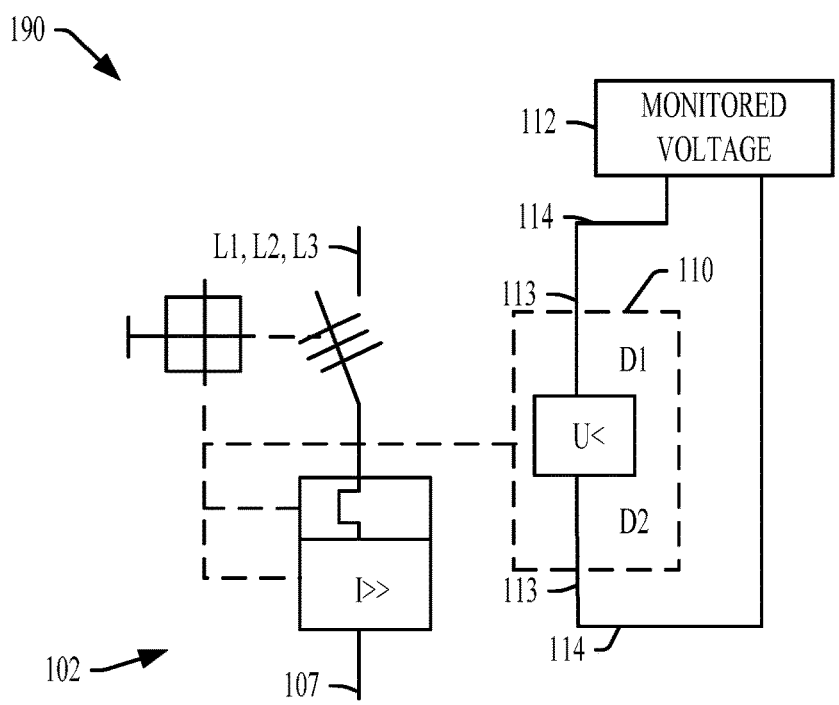
FIG. 1D is a schematic diagram of an undervoltage trip implementation.

FIG. 1C shows a schematic diagram of a shunt trip implementation of the trip apparatus 110. When configured as a shunt trip, the trip apparatus 110 selectively actuates the circuit breaker 102 in response to the voltage at the power terminals 113 falling below the configured threshold. FIG. 1D shows a schematic diagram of an undervoltage trip implementation of the trip apparatus 110. When configured as an undervoltage trip, the trip apparatus 110 selectively actuates the circuit breaker 102 in response to the monitored voltage at the power terminals 113 reaching or exceeding the configured threshold. In the illustrated examples of FIGS. 1C and 1D, the circuit breaker 102 opens the contacts to electrically disconnect the power lines L1-L3 from the motor drive 106 in response to mechanical actuation by the trip apparatus 110 of the actuator interface 115 or in response to an overtemperature condition sensed in the circuit breaker 102, or in response to an overcurrent condition sensed in the circuit breaker 102, as schematically shown in FIGS. 1C and 1D. In other implementations, one or both additional internal trip conditions can be omitted, or other conditional trips can be implemented in the circuit breaker 102 in addition to the mechanical actuation by the actuator 118 of the trip apparatus 110.

As best shown in FIG. 1B the power terminals 113 receive an input voltage VIN (e.g., from the monitored or controlled voltage source 112 in FIG. 1). The power terminals 113 of the trip apparatus 110 are coupled to a filter circuit 130, and the illustrated example includes an input fuse. In other implementations, one or both of the fuse and the filter circuit 130 can be omitted. The trip apparatus 110 in this example also includes a rectifier 132. The illustrated rectifier is a full bridge diode rectifier having four diodes. In other implementations, a half bridge or single diode rectifier circuit can be used. The input circuitry of the trip apparatus 110 accommodates an AC or a DC input voltage signal VIN received from the control door monitored voltage source 112. The rectifier 132 has an output 134 that provides a rectified voltage signal VRECT during powered operation of the input circuit of the trip apparatus 110.

A blocking diode 136 in this example has an anode coupled to the rectifier output 134, as well as a cathode coupled to provide a DC input voltage signal VDCIN to an input 138 of a first regulator 140. The first regulator 140 has an output 142 that provides a first regulated DC voltage signal V1 (e.g., 24 VDC) through an output inductor to a first regulator output 144. The trip apparatus 110 also includes a second regulator 150 having an input coupled to the first regulator output 144. The second regulator 150 as an output 152 that provides a second regulated DC voltage signal V2 (e.g., 3.6 VDC) through a second output inductor to a second regulator output 154.

The second regulator output 154 is coupled to a power input of the processor 124. The processor 124 has a first input 160, a second input 162, and an output 164. The first input 160 of the processor 124 is coupled to the output 134 of the rectifier 132 through a resistive voltage divider circuit to receive a divided voltage signal VDIV that represents the rectifier voltage signal VRECT. The second input 162 of the processor 124 is coupled to an output of the selector 122, and the output 164 of the processor is coupled to the actuator 118 to control a voltage of the mechanical actuator coil 117.

The selector 122 in this example includes a switch network with a plurality (e.g., 5) of two-position switches that are coupled to a resistor network. In the example of FIG. 1B, the switch network includes resistors individually coupled between a supply node (e.g., the second regulator output 154) and a respective resistor of the resistor network. The resistor network includes a first resistor R1 (e.g., 10 K ohms) that is coupled between the second input 162 of the processor 124 and a reference node, as well as a second resistor R2 (e.g., 150 K ohms), a third resistor R3 (e.g., 75 K ohms), as well as fourth and fifth resistors R4 (e.g., 39 K ohms) and R5 (e.g., 20 K ohms). The resistances of the resistors R2-R5 allows the processor 124 to differentiate between different selected switch patterns as set by a user. In the illustrated example, the resistances of the resistors R2-R5 are different, although not a strict requirement of all possible implementations. The illustrated example, moreover, provides binary-coded-decimal (BCD) coding via the resistances of the resistors R2-R5.

The resistors R2-R5 are individually coupled between a respective switch of the switch network and the second input 162 of the processor 124. Although the illustrated example uses four BCD encoded resistors R2-R5, other implementations are possible using a different number of such resistors and associated switches. Depending on the switch configuration chosen by a user, the selector 122 provides a select signal SEL at the second input 162 of the processor 124 having a value that corresponds to the chosen switch configuration. The second input 162 of the processor 124 in one example is an analog-to-digital converter input (ADC input) of the processor 124.

In operation, when the trip apparatus 110 is powered, the processor 124 reads the select signal SEL and determines a chosen configuration of the trip apparatus 110 according to the voltage of the select signal SEL. In one implementation, the configuration chosen by user setting of the switches configures a voltage threshold TH of the trip apparatus 110. In another implementation, the switch positions selected by a user configures both a voltage threshold and a trip mode of the trip apparatus 110. In the illustrated example, both features of the trip apparatus 110 are configured by the user selected switch positions of the selector 122. In this manner, a single universal trip apparatus 110 can be configured by a user to operate as a shunt trip device or as an undervoltage trip device. Moreover, the switch selection in these examples provides user configurability of a voltage threshold used by the processor 124 to allow use of the universal trip apparatus 110 in a variety of different systems having different input voltages VIN at the power terminals 113.

The processor 124 in one example includes an internal electronic memory (not shown) that stores data values and provides a non-transitory computer-readable medium that stores computer-executable instructions which, when executed by the processor 124, cause the processor 124 to implement the various functions and features described herein. In one example, the processor 124 is configured by execution of computer-executable instructions stored in the electronic memory to determine the threshold TH used in trip operations based on the select signal SEL received at the second input 162 of the processor 124. In addition, the processor 124 compares a divider voltage VDIV at the first input 160 of the processor 124 to the threshold TH. In the illustrated trip apparatus 110, a resistive divider network including resistors R11, R12, R13, and R14 are coupled in series with one another between the reference node and the output 134 of the rectifier 132. The node that joins the resistors R11 and R12 is coupled to the first input 160 of the processor 124. In one implementation, the first input 160 of the processor 124 provides a second ADC input. In another possible implementation, a multiplexer (not shown) allows the processor 124 to use a single internal ADC (not shown) to convert the divider voltage VDIV and the voltage of the select signal SEL.

The output 164 of the processor 124 is coupled through a resistor to a gate control terminal of a control transistor 170 to selectively power the mechanical actuator coil 117 of the actuator 118. The first regulator output 144 in this example is coupled to a first terminal of the mechanical actuator coil 117 by the control transistor 170 (e.g., a field effect transistor or FET), and a second terminal of the coil 117 is coupled to the reference node output of the rectifier 132. In this example, the processor 124 controls a voltage signal VTRIP at the output 164 in one of two distinct states, including a state that turns the transistor 170 on, and another state that turns the transistor 170 off. When the transistor 170 is turned on, the mechanical actuator coil 117 is powered.

In operation in this example, the processor 124 generates the TRIP signal state to control a voltage of the coil 117 to selectively control the pusher member 116 in the first or second position based on the comparison of the voltage VDIV at the first input 160 of the processor 124 to the threshold TH. The processor 124 obtains a converted value for the select signal SEL and determines the user selected trip mode for operating the trip apparatus 110 (e.g., SHUNT TRIP or UNDERVOLTAGE TRIP) based on the select signal SEL received at the second input 162 of the processor 124.

In this example, responsive to the trip mode being a first trip mode SHUNT TRIP, the processor 124 controls the voltage of the coil 117 to control the pusher member 116 in the second position responsive to the voltage VDIV at the first input 160 of the processor 124 being greater than or equal to the threshold TH. In the SHUNT TRIP mode, moreover, the processor 124 controls the voltage of the coil 117 to control the pusher member 116 in the first position responsive to the voltage VDIV at the first input 160 of the processor 124 being less than the threshold TH.

In this example, moreover, responsive to the trip mode being a second trip mode UNDERVOLTAGE TRIP, the processor 124 controls the voltage of the coil 117 to control the pusher member 116 in the first position responsive to the voltage VDIV at the first input 160 of the processor 124 being greater than or equal to the threshold TH. In the UNDERVOLTAGE TRIP mode, the processor 124 also controls control the voltage of the coil 117 to control the pusher member 116 in the second position responsive to the voltage VDIV at the first input 160 of the processor 124 being less than the threshold TH. In this example implementation, the trip apparatus 110 provides a single universal device for use in connection with a circuit breaker 102 to accommodate user actuation of a remote trip for shunt trip operation, or voltage monitored undervoltage trip operation based on the user selection of the switch positions of the selector 122. The switch selection, moreover, also determines the threshold TH used by the processor 124 in detecting shunt trip or undervoltage events based on the voltage levels of a given host system 100.

Figure 2:
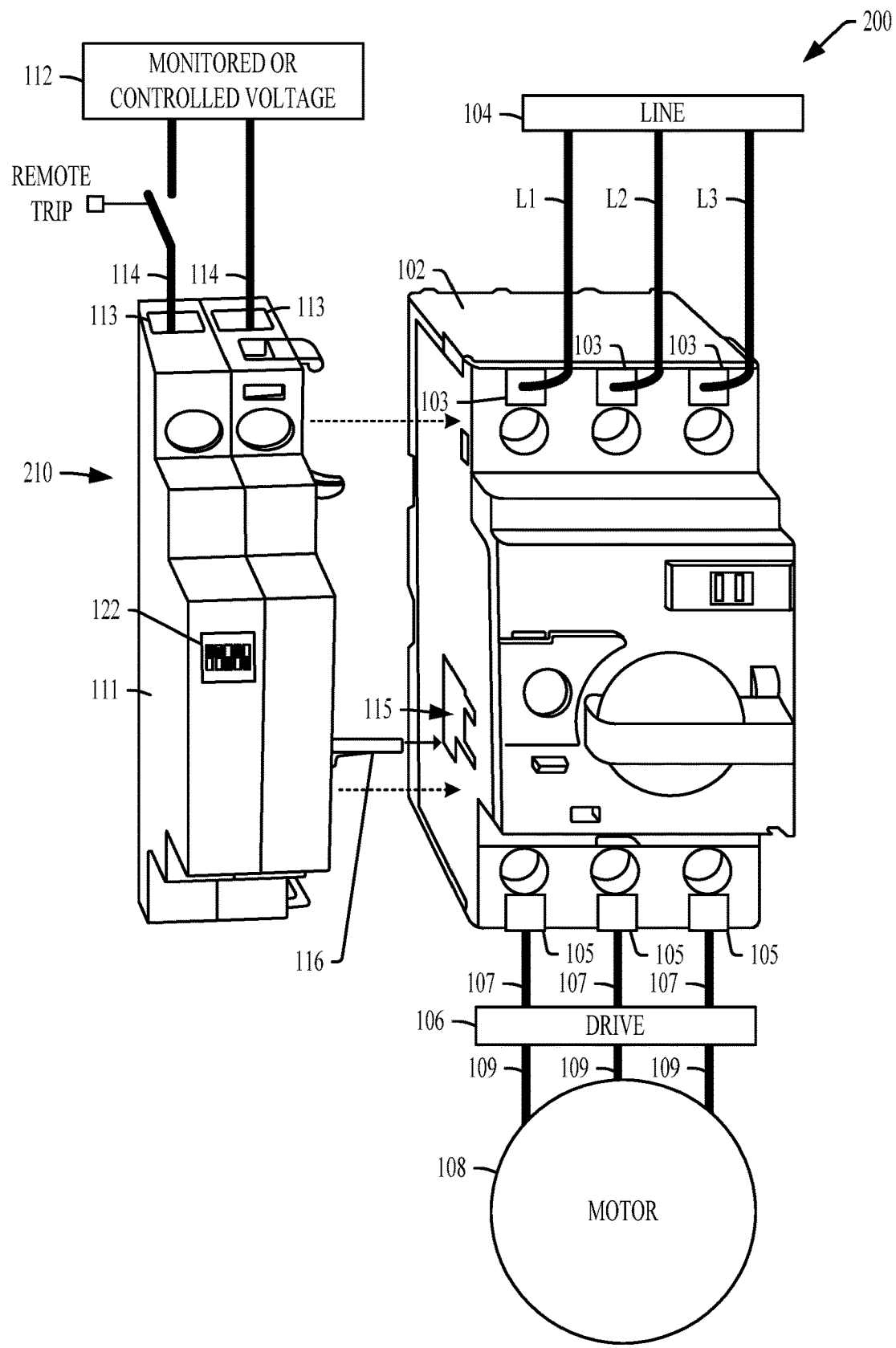
FIG. 2 is another front perspective view of a motor drive system with a universal shunt trip or undervoltage trip apparatus with external configuration switches.

FIG. 2 shows another motor drive system 200 with a universal shunt trip or undervoltage trip apparatus 210 having a selector 122 including external configuration switches. In this example, the selector switch of the selector 122 is located on a front face of the trip apparatus housing 111. In the example of FIGS. 1-1 B above, the selector switches are located inside the trip apparatus housing 111, which allows configuration during system installation, but does not allow for reconfiguration in operation of the system 100. The example trip apparatus 210 in FIG. 2 further allows reconfiguration while the trip apparatus 210 is installed on the circuit breaker 102. In another possible implementation, the circuit breaker 102 includes a user selectable switch feature that allows a user to select a voltage threshold and possibly a trip mode of the universal trip apparatus 110, 210. In one implementation, for example, the circuit breaker 102 includes a rotary knob feature on the front face of the circuit breaker 102, and the interface between the circuit breaker 102 and the universal trip apparatus 110, 210 provides electrical connection from the processor 124 to the selection feature provided on the circuit breaker 102 (not shown).

The illustrated examples advantageously provide a configurable solution that reduces the number of stock keeping units (SKUs) for shunt trip or undervoltage trip installations that are required by a manufacturer or customer to implement such protective circuitry in a variety of different systems. The illustrated solutions facilitate operation across a wide range of input voltages for shunt trip and/or undervoltage trip applications in connection with a circuit breaker 102. In addition, the inventory carrying costs of a given operation are reduced, thereby reducing the cost of the system 100 and reducing the cost of manufacturing the trip apparatus 110. Further benefits include competitive costs, smaller form factor possibilities, and lower weight. Specific examples provide switch mode power supply regulators (e.g., the first and second regulators 140 and 150 in FIG. 1B) to allow use of the universal trip apparatus 110, 210 across a wide range of input voltages VIN. To the extent different voltage regulators are needed for coverage of an even wider input voltage range, two or a small number of different printed circuit board designs can be used, for example, in connection with a small number of stock keeping units to support shunt trip and/or undervoltage trip applications. In another possible example, the user selected configuration determines the select signal voltage SEL that sets a particular threshold voltage for a given SKU, and different SKUs are provided for dedicated trip voltage installations or undervoltage trip installations. In all these examples, the use of the configurable threshold, alone or in further combination with the configurable trip mode, facilitates reduction in the number of SKUs needed for a given factory or manufacturing operation, while still providing support for a wide variety of different trip installation possibilities.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A motor drive system, comprising:
   a circuit breaker having a line contact, a load contact, and an actuator interface, the line contact adapted to be coupled to a power line, the circuit breaker configured to operate in a first state to electrically couple the line contact to the load contact, and a second state to electrically disconnect the line contact from the load contact, the circuit breaker configured to operate in the second state responsive to mechanical actuation of the actuator interface;
   a motor drive with an input coupled to the load contact; and
   a trip apparatus attached to the circuit breaker, the trip apparatus having a power terminal, an actuator, a selector, a processor, and a rectifier; the power terminal coupled to a monitored or controlled voltage; the actuator having a pusher member and a coil, the pusher member movable between a first position that does not actuate the actuator interface and a second position that actuates the actuator interface; the rectifier having an input and an output, the input of the rectifier coupled to the power terminal; the processor having a first input, a second input, and an output, the first input of the processor coupled to the output of the rectifier, the second input of the processor coupled to an output of the selector, and the output of the processor coupled to the actuator; the processor configured to: determine a threshold based on a select signal received at the second input of the processor, compare a voltage at the first input of the processor to the threshold, and control a voltage of the coil to selectively control the pusher member in the first or second position based on the comparison of the voltage at the first input of the processor to the threshold.

2. The motor drive system of claim 1, wherein the processor is configured to:
   determine a trip mode based on the select signal received at the second input of the processor;

responsive to the trip mode being a first trip mode: control the voltage of the coil to control the pusher member in the second position responsive to the voltage at the first input of the processor being greater than or equal to the threshold, and control the voltage of the coil to control the pusher member in the first position responsive to the voltage at the first input of the processor being less than the threshold; and responsive to the trip mode being a second trip mode: control the voltage of the coil to control the pusher member in the first position responsive to the voltage at the first input of the processor being greater than or equal to the threshold, and control the voltage of the coil to control the pusher member in the second position responsive to the voltage at the first input of the processor being less than the threshold.

3. The motor drive system of claim 2, wherein the selector includes a switch network and a resistor network, the resistor network including resistors individually coupled between a supply node and a respective resistor of the resistor network, the resistor network including a first resistor coupled between the second input of the processor and a reference node, a second resistor coupled between a switch of the switch network and the second input of the processor, and a third resistor coupled between another switch of the switch network and the second input of the processor.

4. The motor drive system of claim 2, wherein the second and third resistors have different resistances.

5. The motor drive system of claim 1, wherein the selector includes a switch network and a resistor network, the resistor network including resistors individually coupled between a supply node and a respective resistor of the resistor network, the resistor network including a first resistor coupled between the second input of the processor and a reference node, a second resistor coupled between a switch of the switch network and the second input of the processor, and a third resistor coupled between another switch of the switch network and the second input of the processor.

6. The motor drive system of claim 5, wherein the second and third resistors have different resistances.

7. The motor drive system of claim 1, wherein the processor is configured to:
control the voltage of the coil to control the pusher member in the second position responsive to the voltage at the first input of the processor being greater than or equal to the threshold; and
control the voltage of the coil to control the pusher member in the first position responsive to the voltage at the first input of the processor being less than the threshold.

8. The motor drive system of claim 1, wherein the processor is configured to:
control the voltage of the coil to control the pusher member in the first position responsive to the voltage at the first input of the processor being greater than or equal to the threshold; and
control the voltage of the coil to control the pusher member in the second position responsive to the voltage at the first input of the processor being less than the threshold.

9. The motor drive system of claim 1, wherein the selector is externally accessible for selection by a user.

10. A trip apparatus, comprising:
a power terminal coupled to a monitored or controlled voltage;
an actuator having a pusher member and a coil, the pusher member movable between a first position that does not actuate an actuator interface of a connected circuit breaker and a second position that actuates the actuator interface;
a rectifier having an input and an output, the input of the rectifier coupled to the power terminal;
a selector; and
a processor having a first input, a second input, and an output, the first input of the processor coupled to the output of the rectifier, the second input of the processor coupled to an output of the selector, and the output of the processor coupled to the actuator; the processor configured to:
determine a threshold based on a select signal received at the second input of the processor, compare a voltage at the first input of the processor to the threshold, and
control a voltage of the coil to selectively control the pusher member in the first or second position based on the comparison of the voltage at the first input of the processor to the threshold.

11. The trip apparatus of claim 10, wherein the processor is configured to:
determine a trip mode based on the select signal received at the second input of the processor;
responsive to the trip mode being a first trip mode: control the voltage of the coil to control the pusher member in the second position responsive to the voltage at the first input of the processor being greater than or equal to the threshold, and control the voltage of the coil to control the pusher member in the first position responsive to the voltage at the first input of the processor being less than the threshold; and
responsive to the trip mode being a second trip mode: control the voltage of the coil to control the pusher member in the first position responsive to the voltage at the first input of the processor being greater than or equal to the threshold, and control the voltage of the coil to control the pusher member in the second position responsive to the voltage at the first input of the processor being less than the threshold.

12. The trip apparatus of claim 11, wherein the selector includes a switch network and a resistor network, the resistor network including resistors individually coupled between a supply node and a respective resistor of the resistor network, the resistor network including a first resistor coupled between the second input of the processor and a reference node, a second resistor coupled between a switch of the switch network and the second input of the processor, and a third resistor coupled between another switch of the switch network and the second input of the processor.

13. The trip apparatus of claim 12, wherein the second and third resistors have different resistances.

14. The trip apparatus of claim 10, wherein the selector includes a switch network and a resistor network, the resistor network including resistors individually coupled between a supply node and a respective resistor of the resistor network, the resistor network including a first resistor coupled between the second input of the processor and a reference node, a second resistor coupled between a switch of the switch network and the second input of the processor, and a third resistor coupled between another switch of the switch network and the second input of the processor.

15. The trip apparatus of claim 14, wherein the second and third resistors have different resistances.

16. The trip apparatus of claim 10, wherein the processor is configured to:

control the voltage of the coil to control the pusher member in the second position responsive to the voltage at the first input of the processor being greater than or equal to the threshold; and control the voltage of the coil to control the pusher member in the first position responsive to the voltage at the first input of the processor being less than the threshold.

17. The trip apparatus of claim 10, wherein the processor is configured to:

control the voltage of the coil to control the pusher member in the first position responsive to the voltage at the first input of the processor being greater than or equal to the threshold; and control the voltage of the coil to control the pusher member in the second position responsive to the voltage at the first input of the processor being less than the threshold.

18. The trip apparatus of claim 10, wherein the selector is externally accessible for selection by a user.

19. A circuit breaker system, comprising:

a circuit breaker having a line contact, a load contact, and an actuator interface, the line contact adapted to be coupled to a power line, the circuit breaker configured to operate in a first state to electrically couple the line contact to the load contact, and a second state to electrically disconnect the line contact from the load contact, the circuit breaker configured to operate in the second state responsive to mechanical actuation of the actuator interface; and a trip apparatus attached to the circuit breaker, the trip apparatus having a power terminal, an actuator, a selector, a processor, and a rectifier; the power terminal coupled to a monitored or controlled voltage; the actuator having a pusher member and a coil, the pusher member movable between a first position that does not actuate the actuator interface and a second position that actuates the actuator interface; the rectifier having an input and an output, the input of the rectifier coupled to the power terminal; the processor having a first input, a second input, and an output, the first input of the processor coupled to the output of the rectifier, the second input of the processor coupled to an output of the selector, and the output of the processor coupled to the actuator; the processor configured to: determine a threshold based on a select signal received at the second input of the processor, compare a voltage at the first input of the processor to the threshold, and control a voltage of the coil to selectively control the pusher member in the first or second position based on the comparison of the voltage at the first input of the processor to the threshold.

20. The circuit breaker system of claim 19, wherein the processor is configured to:

determine a trip mode based on the select signal received at the second input of the processor;

responsive to the trip mode being a first trip mode: control the voltage of the coil to control the pusher member in the second position responsive to the voltage at the first input of the processor being greater than or equal to the threshold, and control the voltage of the coil to control the pusher member in the first position responsive to the voltage at the first input of the processor being less than the threshold; and responsive to the trip mode being a second trip mode: control the voltage of the coil to control the pusher member in the first position responsive to the voltage at the first input of the processor being greater than or equal to the threshold, and control the voltage of the coil to control the pusher member in the second position responsive to the voltage at the first input of the processor being less than the threshold.

* * * * *

UNITED STATES PATENT AND TRADEMARK OFFICE
CERTIFICATE OF CORRECTION

Page 1 of 1

PATENT NO. : 11,495,956 B1
APPLICATION NO. : 17/410681
DATED : November 8, 2022
INVENTOR(S) : Thomas Strebel Marzano and Walter Hunziker It is certified that error appears in the above-identified patent and that said Letters Patent is hereby corrected as shown below:

On the Title Page

Item (73) should read:
(73) Assignee: Rockwell Automation Switzerland GmbH, Aurau (CH)

Signed and Sealed this
Fourteenth Day of May, 2024

Katherine Kelly Vidal
*Director of the United States Patent and Trademark Office*